United States Patent
Tsai

[19]

[11] Patent Number: 5,986,586
[45] Date of Patent: Nov. 16, 1999

[54] KEYBOARD WITH ADDITIONAL HOT KEYS

[75] Inventor: Tien-Chin Tsai, Taipei, Taiwan

[73] Assignee: Silitek Corporation, Taiwan

[21] Appl. No.: 08/713,432

[22] Filed: Sep. 13, 1996

[30] Foreign Application Priority Data

Jul. 16, 1996 [CN] China .................................. 85210814

[51] Int. Cl.$^6$ .................................................. H04B 1/40
[52] U.S. Cl. .............................. 341/22; 345/168; 341/26
[58] Field of Search .................. 341/22, 23, 26; 345/168, 172; 364/709.14

[56] References Cited

U.S. PATENT DOCUMENTS

| D. 357,011 | 4/1995 | Paull et al. ............................... D14/100 |
| 3,894,346 | 7/1975 | Ward et al. . |
| 4,583,092 | 4/1986 | Saito .................................. 340/825.79 |
| 4,698,618 | 10/1987 | Liuzzo ..................................... 341/22 |
| 5,181,029 | 1/1993 | Kim ......................................... 341/22 |
| 5,339,095 | 8/1994 | Redford ................................. 345/158 |
| 5,387,042 | 2/1995 | Brown ..................................... 400/477 |
| 5,646,648 | 7/1997 | Bertram ................................. 345/168 |
| 5,699,059 | 12/1997 | Hiller ....................................... 341/22 |
| 5,717,430 | 2/1998 | Copland et al. ........................ 345/168 |

*Primary Examiner*—Michael Horabik
*Assistant Examiner*—Albert K. Wong
*Attorney, Agent, or Firm*—Smith, Gambrell & Russell, LLP

[57] ABSTRACT

This invention relates to a keyboard with additional hot keys which can be used to control and manipulate peripheral equipment, for example, a multi-media peripheral equipment. It generally comprises a keyboard and a plurality of, namely 1 to 15, hot keys disposed at said keyboard. Said hot keys are interconnected to the I/O ports of the circuit configuration of the micro processor of the keyboard, accordingly, a new 9×16 scan matrix is transformed from original 8×16 scan matrix. Those hot keys can be executed according to the application program of the Windows. By this arrangement the operator may directly control and manipulate the multi-media peripheral equipment and the status can be displayed on the monitor directly as well. Besides, those hot keys may also be designed with a macro procedure to carry out preset controlling procedure, i.e. filecopy, or other function.

9 Claims, 2 Drawing Sheets

KEYBOARD WITH ADDITIONAL HOT KEYS

FIELD OF THE INVENTION

The present invention relates to a keyboard, more particularly, to a keyboard with additional hot keys which can be used to control or manipulate the multi-media peripheral equipment, such as the CD ROM. Those hot keys are adequately incorporated onto the keyboard to execute those functions provided by the peripheral equipment with application program of WINDOWS. By this arrangement, the operator may control and manipulate the functions provided by the multi-media peripheral equipment and the status can be suitably monitored by the monitor. On the other hand, those functional key may by programmed to execute a macro procedure for a preset controlling procedures or other functions.

For a standard keyboard, which is widely accepted and normally referred to IBM's keyboard, it generally incorporates with one hundred and eight (108) key codes for designating a key. Nevertheless, when special keys for a designated language and system command are subtracted, there only eight (8) keys available. Accordingly, the utilization of the Hot keys is limited.

On the other hand, the operation of a peripheral equipment for example, PLAY, ←, →, Volume, . . . etc. of a CD ROM, is directly controlled and manipulated through the keypad disposed at said equipment. Said equipment can not be controlled and manipulated through the keyboard. On the other hand, those status can not be advised also from the monitor.

SUMMARY OF THE INVENTION

It is the object of this invention to provide a keyboard with additional hot keys wherein the peripheral equipment can be directly controlled and monitored.

According to one embodiment of the present invention, a plurality of hot keys, preferably 1 to 15 keys, are disposed at suitable position of the keyboard. Said hot keys are interconnected to the additional I/O ports of the circuit configuration of the micro processor. These hot keys are adequately interconnected with the original 8×16 Scan Matrix to form a 9×16 Scan Matrix. Accordingly, those hot keys may functionally execute the application programs provided by the WINDOWS which in turn control and manipulate the functions provided by the peripheral equipment.

It is still the object of this invention to provide a keyboard with additional hot keys wherein those hot keys can be preset to execute a Macro Procedure to carry out a preset control or other functions.

BRIEF DESCRIPTION OF DRAWINGS

These and other objects, shape and configuration or device and characteristics may become more apparently in conjunction with the following description and drawings which are explanatory and not for limitation, wherein.

DETAILED DESCRIPTION OF PREFERRED EMBODIMENT

Figure 1:
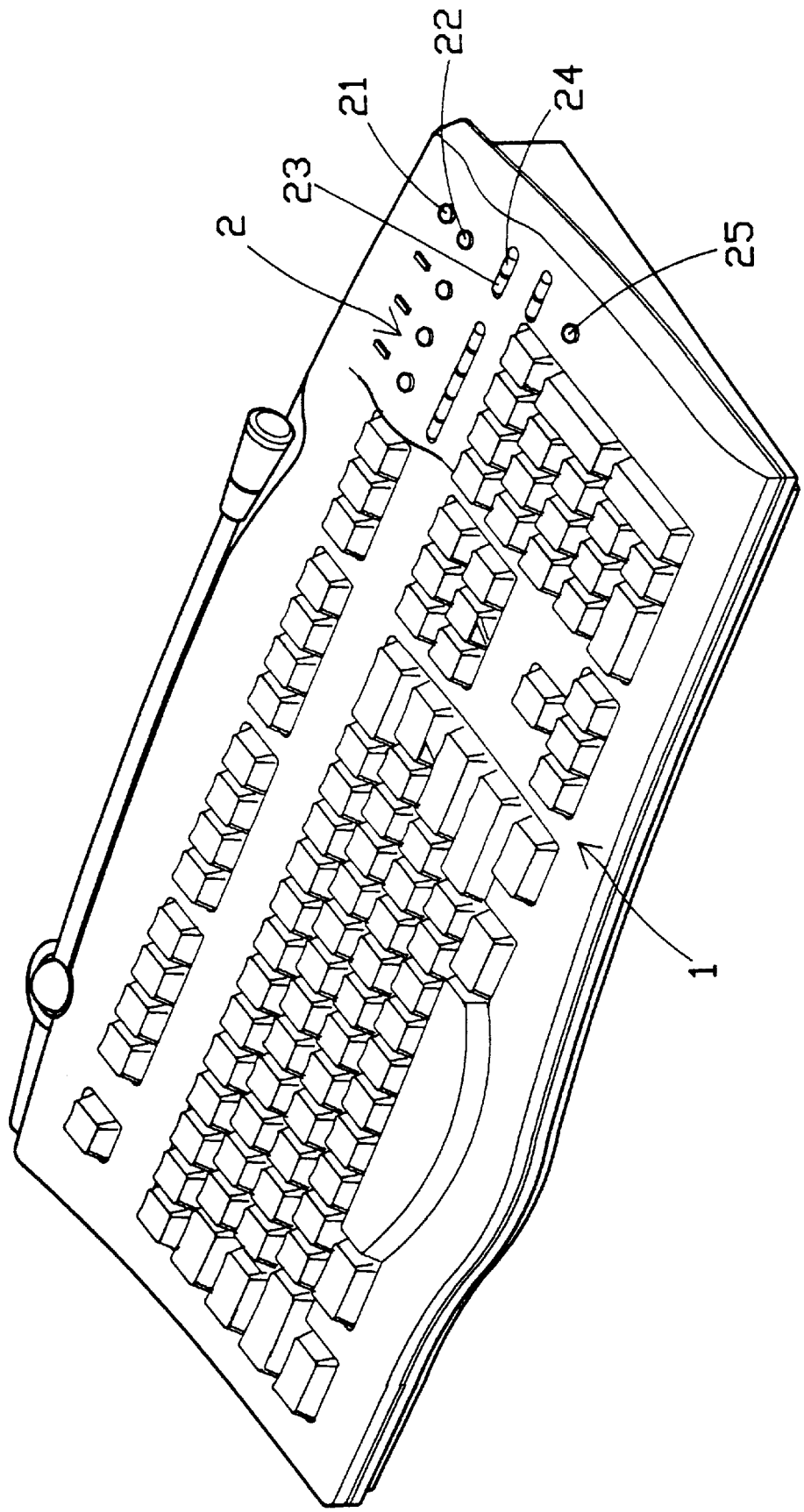
FIG. 1 is a perspective view of the keyboard with additional hot keys made according to this invention.

Referring to FIG. 1, the keyboard with additional hot keys generally comprises a keyboard 1 and a plurality of additional hot keys 2.

Figure 2:
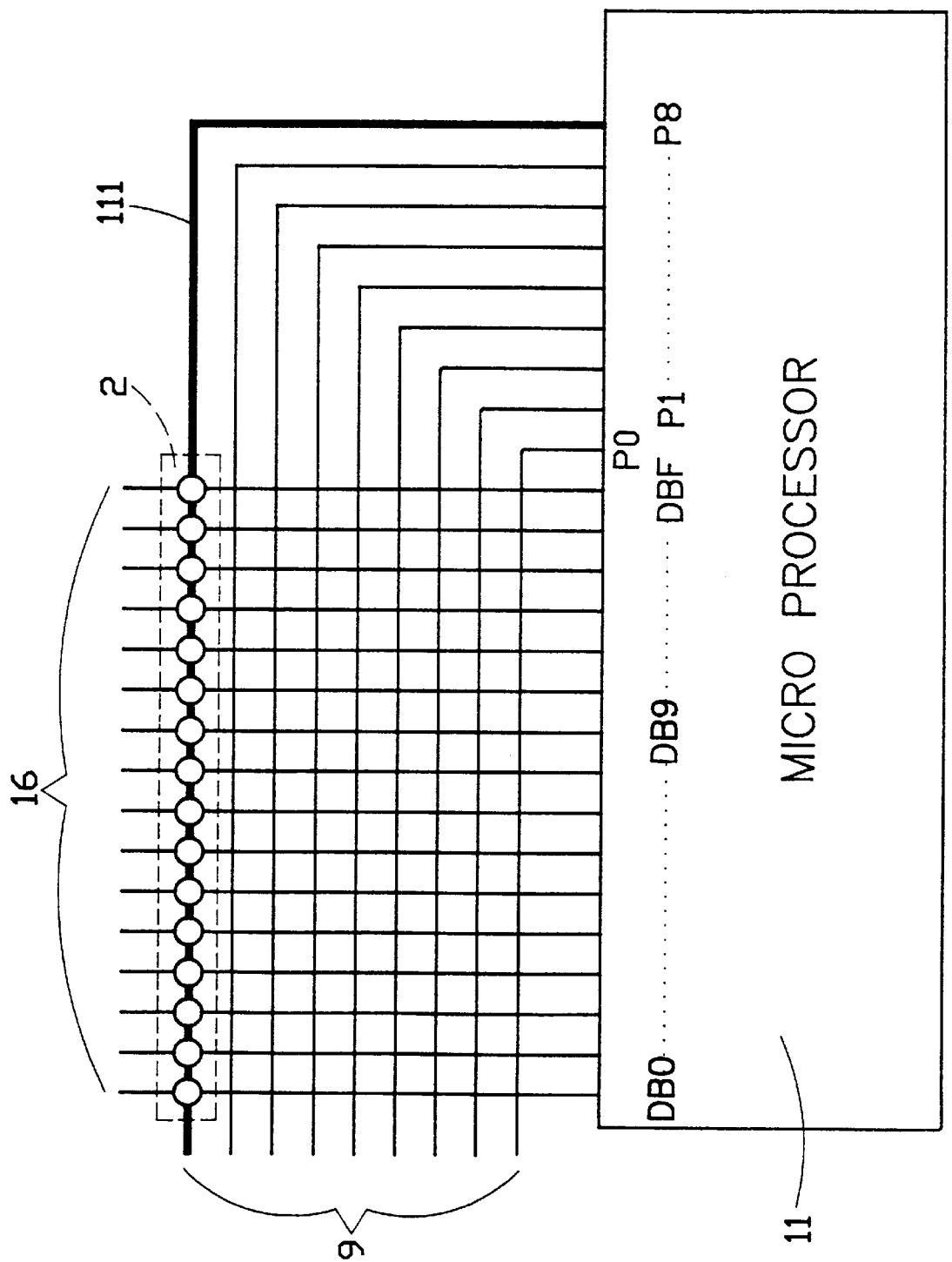
FIG. 2 is matrix showing the additional hot keys are incorporated thereof.

In one of the preferable embodiment, a plurality of, about 1 to 15, hot keys 2 are disposed at right upper corner of the keyboard 1. Those hot keys 2 generally includes "CD Player" 21, "Play" 22, "←" 23, "→" 24, "Volume" 25, . . . etc. Those hot keys 2 are interconnected with an additional I/O ports 111 of the circuit configuration of the micro processor 11. Besides, these hot keys 2 can be suitably incorporated within the original 8×16 Scan Matrix 12 to establish a newly 9×16 Scan Matrix, as shown in FIG. 2. By this arrangement, the additional hot keys 2 can be smoothly incorporated into the original Scan Matrix. If the number of additional hot keys exceeds 16, then the Scan Matrix can be adapted to 9×16, 10×16, or 11×16, . . . to meet the requirements.

On the other hand, with the provision of application programs of the Windows, the operator may directly control and manipulate the functions provided by the peripheral equipment, a CD ROM in this embodiment.

When the "CD Player" 21 of the hot keys 2 is depressed, the application program of the WINDOWS will hook the scan code designated to "CD Player" and further this scanned code belongs to hot key code.

If the scanned code of "CD Player" 21 has been successfully determined, then the application program of the WINDOWS will enter the path and application program, PLYER.EXE (Bundle with WINDOWS 95) into the function of Win ExecO of the Window API. Accordingly. the "CD Player" is triggered and the status will show on the monitor immediately.

Meanwhile, if the operator depress "Play" 22 of the "CD Player" of the hot keys 2, according to above description, the application program of the WINDOWS will change the hot key code of the "Play" into the Keyboard Stroke of the Ctrl+P and this result will feedback to the Windows system. The "Play" will be executed when the CD Player receives it.

By the above description, the keyboard made according to this invention can realize its object to make the keyboard more flexible and versatile.

While particular embodiment of the present invention has been illustrated and described, it would be obvious to those skilled in the art that various other changes and modifications can be made without departing from the spirit and scope of the invention, for example, the Scan Matrix can be expanded to meet special requirements. It is therefore intended to cover in the appended claims all such changes and modifications that are within the scope of the present invention.

I claim:

1. A keyboard with additional hot keys comprising; a keyboard having a plurality of hot keys, said hot keys being interconnected with a micro processor disposed within said keyboard, said hot keys being incorporated into a new scan matrix, wherein said hot keys have a dedicated function for solely and directly controlling and manipulating peripheral equipment, and wherein said peripheral equipment includes a multi-media device.

2. The keyboard with additional hot keys as recited in claim 1, wherein the multi-media device includes a CD ROM device.

3. A keyboard with additional hot keys comprising: a keyboard having a plurality of hot keys, the hot keys being interconnected with a micro processor disposed within the keyboard, wherein the hot keys are designated to undefined position of an original scan matrix for the keyboard, wherein the hot keys have a dedicated function for solely and directly controlling and manipulating functions of peripheral equipment, and wherein the peripheral equipment includes a multi-media device.

4. The keyboard with additional hot keys as recited in claim 1, further including means for displaying status information relating to said peripheral equipment.

5. The keyboard with additional hot keys as recited in claim 4, wherein:

one of said hot keys is a play, said play key controlling said CD ROM device to play.

6. The keyboard with additional hot keys as recited in claim 2, wherein:

one of said hot keys is a volume key, said volume key controlling a volume control of said CD ROM device.

7. The keyboard with additional hot keys as recited in claim 2, wherein:

one of said hot keys is a rewind key, said rewind key controlling said CD ROM device to rewind.

8. The keyboard with additional hot keys as recited in claim 2, wherein:

one of said hot keys is a fast forward key, said fast forward key controlling said CD ROM device to fast forward.

9. A system for controlling a CD ROM device associated with a computer, comprising:

a keyboard device including a plurality of hot keys, wherein the hot keys are interconnected with a micro processor for the keyboard, and wherein the hot keys solely and directly control functions of the CD ROM device associated with the computer to which the keyboard device is connected, and wherein the hot keys include:

a first hot key for controlling the CD ROM device to play, a second hot key for controlling a sound volume from the CD ROM device, a third hot key for controlling the CD ROM device to rewind, and a fourth hot key for controlling the CD ROM device to fast forward; and means for displaying status information relating to the CD ROM device on a monitor of the computer.

* * * * *

UNITED STATES PATENT AND TRADEMARK OFFICE
CERTIFICATE OF CORRECTION

PATENT NO.   : 5,986,586
DATED        : November 16, 1999
INVENTOR(S)  : Tien-Chin Tsai It is certified that error appears in the above-identified patent and that said Letters Patent is hereby corrected as shown below:

<u>Title page,</u>
Item [30], Foreign Application Priority Data, delete the word "China" and insert -- Taiwan, R.O.C. --.

Signed and Sealed this

Eighth Day of October, 2002

*Attest:*

*Attesting Officer*

JAMES E. ROGAN
*Director of the United States Patent and Trademark Office*